US011285971B2

(12) United States Patent
Kawauchi et al.

(10) Patent No.: US 11,285,971 B2
(45) Date of Patent: Mar. 29, 2022

(54) IN-VEHICLE DEVICE AND INCIDENT MONITORING METHOD

(71) Applicant: CLARION CO., LTD., Saitama (JP)

(72) Inventors: Takashi Kawauchi, Tokyo (JP); Yasushi Nagai, Saitama (JP); Nobuyoshi Morita, Tokyo (JP); Makoto Kayashima, Tokyo (JP)

(73) Assignee: CLARION CO., LTD., Saitama (JP)

( * ) Notice: Subject to any disclaimer, the term of this patent is extended or adjusted under 35 U.S.C. 154(b) by 160 days.

(21) Appl. No.: 16/643,456

(22) PCT Filed: Jul. 18, 2018

(86) PCT No.: PCT/JP2018/026903
§ 371 (c)(1),
(2) Date: Feb. 28, 2020

(87) PCT Pub. No.: WO2019/044230
PCT Pub. Date: Mar. 7, 2019

(65) Prior Publication Data
US 2020/0361493 A1 Nov. 19, 2020

(30) Foreign Application Priority Data

Sep. 1, 2017 (JP) .............................. JP2017-168882

(51) Int. Cl.
B60W 60/00 (2020.01)
G01C 21/00 (2006.01)
(Continued)

(52) U.S. Cl.
CPC .... B60W 60/0053 (2020.02); B60W 30/0956 (2013.01); B60W 40/04 (2013.01);
(Continued)

(58) Field of Classification Search
CPC ......... B60W 60/0053; B60W 60/0025; B60W 30/0956; B60W 40/04; B60W 50/14; G01C 21/38
See application file for complete search history.

(56) References Cited

U.S. PATENT DOCUMENTS 9,248,834 B1 * 2/2016 Ferguson ............. G05D 1/0088
9,616,828 B2 * 4/2017 Ben Noon ............. G06F 11/30
(Continued)

FOREIGN PATENT DOCUMENTS

CN 105050868 A 11/2015
JP 2007-161044 A 6/2007
(Continued)

OTHER PUBLICATIONS

Extended European Search Report dated May 4, 2021 for corresponding European Application No. 18849835.6 (9 pages).
(Continued)

Primary Examiner — Peter D Nolan
Assistant Examiner — Kenneth M Dunne
(74) Attorney, Agent, or Firm — Lewis Roca Rothgerber Christie LLP

(57) ABSTRACT

An in-vehicle device is mounted on a vehicle capable of automated driving, and comprises an incident detection processing unit which acquires vehicle information representing a control state of the vehicle, and detects an incident that occurred in the vehicle based on the vehicle information.

10 Claims, 10 Drawing Sheets

(51) Int. Cl.
  *B60W 30/095* (2012.01)
  *B60W 40/04* (2006.01)
  *B60W 50/14* (2020.01)

(52) U.S. Cl.
  CPC ........ *B60W 50/14* (2013.01); *B60W 60/0025* (2020.02); *G01C 21/38* (2020.08)

(56) References Cited

U.S. PATENT DOCUMENTS

| | | | |
|---|---|---|---|
| 9,725,187 B2* | 8/2017 | Swearingen | B60R 16/0232 |
| 10,356,122 B2* | 7/2019 | Ruvio | H04L 63/1466 |
| 2015/0066239 A1* | 3/2015 | Mabuchi | H04L 63/1408 701/1 |
| 2018/0127001 A1* | 5/2018 | Ricci | G08G 1/096775 |
| 2018/0290660 A1* | 10/2018 | Huang | B60W 40/08 |
| 2019/0061775 A1* | 2/2019 | Emura | B60W 50/0205 |
| 2020/0079393 A1* | 3/2020 | Hasegawa | G05D 1/0061 |

FOREIGN PATENT DOCUMENTS

| | | |
|---|---|---|
| JP | 2013-131907 A | 7/2013 |
| JP | 2014-106854 A | 6/2014 |
| JP | 2017-47835 A | 3/2017 |
| JP | 2017-92835 A | 5/2017 |
| WO | WO 2014/061021 A1 | 4/2014 |
| WO | WO-2014061021 A1 * 4/2014 ........... B60R 16/023 |

OTHER PUBLICATIONS

Japanese Office Action dated Oct. 13, 2020 regarding Japanese Patent Application No. 2017-168882 corresponding to U.S. Appl. No. 16/643,456 (3 pages) with English Translation (4 pages).

Chinese Office Action dated Sep. 18, 2021 regarding Chinese Patent Application No. 16/643,456.9 corresponding to U.S. Appl. No. 16/643,456 (7 pages) with English Translation (6 pages).

* cited by examiner

*FIG. 6*

MAP INFORMATION 600

| LINK ID | SPEED LIMIT | DIRECTION CONSTRAINT | FIRST LATITUDE INFORMATION | SECOND LATITUDE INFORMATION | FIRST LONGITUDE INFORMATION | SECOND LONGITUDE INFORMATION |
|---|---|---|---|---|---|---|
| 359 | 30 | 10 | 4807.038247 | N | 01131.324523 | E |
| ... | | ... | ... | ... | ... | ... |
| 601 | 602 | 603 | 604 | 605 | 606 | 607 |

IN-VEHICLE DEVICE AND INCIDENT MONITORING METHOD

CROSS-REFERENCE TO RELATED APPLICATION(S)

This application is a U.S. National Phase Patent Application and claims priority to and the benefit of International Application Number PCT/JP2018/026903, filed on Jul. 18, 2018, which claims priority of Japanese Patent Application Number 2017-168882, filed on Sep. 1, 2017, the entire contents of all of which are incorporated herein by reference.

TECHNICAL FIELD

The present invention relates to an in-vehicle device that performs incident monitoring and to an incident monitoring method using such in-vehicle device.

BACKGROUND ART

In recent years, the technology of realizing driving safety support systems and automated driving systems of vehicles by acquiring various types of information in a vehicle through communication between electronic control units (ECUs) equipped in the vehicle and external information communication equipment, and using the acquired information, is becoming popular. With this kind of technology, because the constant connection of the ECUs and the external information communication equipment and the use of general-purpose devices and general-purpose programs in the information communication equipment are advancing, the risk of vehicles becoming the target of cyberattacks is increasing. If a vehicle encounters a cyberattack and goes out of control, human damage and property damage will be extensive, and the social impact will be enormous. Thus, if there is a sign of a cyberattack (cyber incident; hereinafter simply referred to as an "incident") against the ECU manufacturer or automobile manufacturer, there are needs for promptly detecting such as an incident and placing the vehicle in a safe state, and minimizing the consequential damage.

In relation to the anomaly detection of vehicles, for instance, known is the technology described in PTL 1. The vehicle fault diagnostic device described in PTL 1 performs the fault diagnosis of a vehicle by comparing the vehicle drive information acquired from the vehicle and the external environment information acquired from a recognizing means which recognizes the surrounding environment, and determining that an anomaly has occurred in the vehicle when the vehicle drive information deviates at a predetermined level or more from a general drive pattern of the vehicle according to the surrounding environment.

CITATION LIST

Patent Literature

[PTL 1] Japanese Unexamined Patent Application Publication No. 2007-161044

SUMMARY OF THE INVENTION

Technical Problem

Nevertheless, with the technology described in PTL 1, because the anomaly of a vehicle is determined by comparing the vehicle drive information acquired from the vehicle and a general drive pattern of the vehicle, it is not possible to determine an anomaly if the vehicle is driving in a manner that is close to a general drive pattern even if an incident has occurred. Accordingly, it is not possible to detect an incident that occurred in a vehicle reliably and quickly.

Solution to Problem

The in-vehicle device according to the present invention is to be mounted on a vehicle capable of automated driving, and comprises an incident detection processing unit which acquires vehicle information representing a control state of the vehicle, and detects an incident that occurred in the vehicle based on the vehicle information. The incident monitoring method according to the present invention is a method in an in-vehicle device mounted on a vehicle capable of automated driving, and comprises a step of acquiring vehicle information representing a control state of the vehicle, and a step of detecting an incident that occurred in the vehicle based on the vehicle information.

Advantageous Effects of the Invention

According to the present invention, an incident that occurred in a vehicle can be detected reliably and quickly.

BRIEF DESCRIPTION OF DRAWINGS

FIG. 6 is an explanatory diagram illustrating the configuration of the map information.

DESCRIPTION OF EMBODIMENTS

Figure 1:
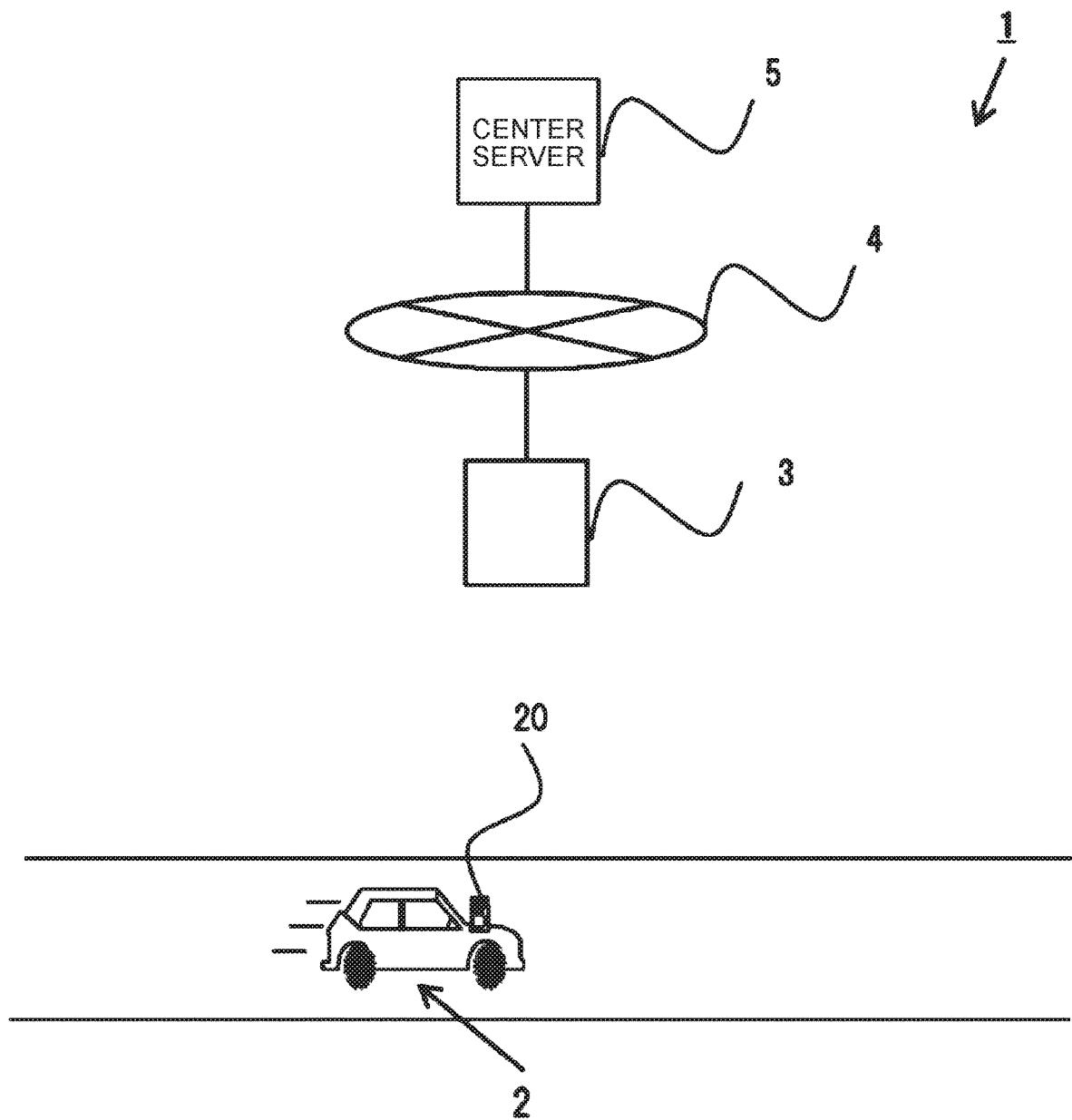
FIG. 1 is a configuration diagram of the vehicle information network system according to an embodiment of the present invention.

An embodiment of the present invention is now explained with reference to FIG. 1 to FIG. 10. FIG. 1 is a configuration diagram of the vehicle information network system according to an embodiment of the present invention. The vehicle information network system 1 shown in FIG. 1 includes a vehicle 2, a roadside unit 3, a network 4, and a center server 5.

The vehicle 2 is equipped with an in-vehicle remote monitoring device 20. A roadside unit 3 is fixed and installed at a predetermined site on a roadside of the road that the vehicle 2 is traveling on. The roadside unit 3 and the center server 5 are mutually connected via the network 4. The center server 5 performs data communication with the in-vehicle remote monitoring device 20 via the network 4 and the roadside unit 3.

Note that the vehicle information network system 1 may include a plurality of vehicles 2 each mounted with an in-vehicle remote monitoring device 20. Moreover, a plurality of roadside units 3 may each be installed at different sites. In the ensuing explanation, the operation of the in-vehicle remote monitoring device 20 mounted on one vehicle 2 will be mainly explained.

Figure 2:
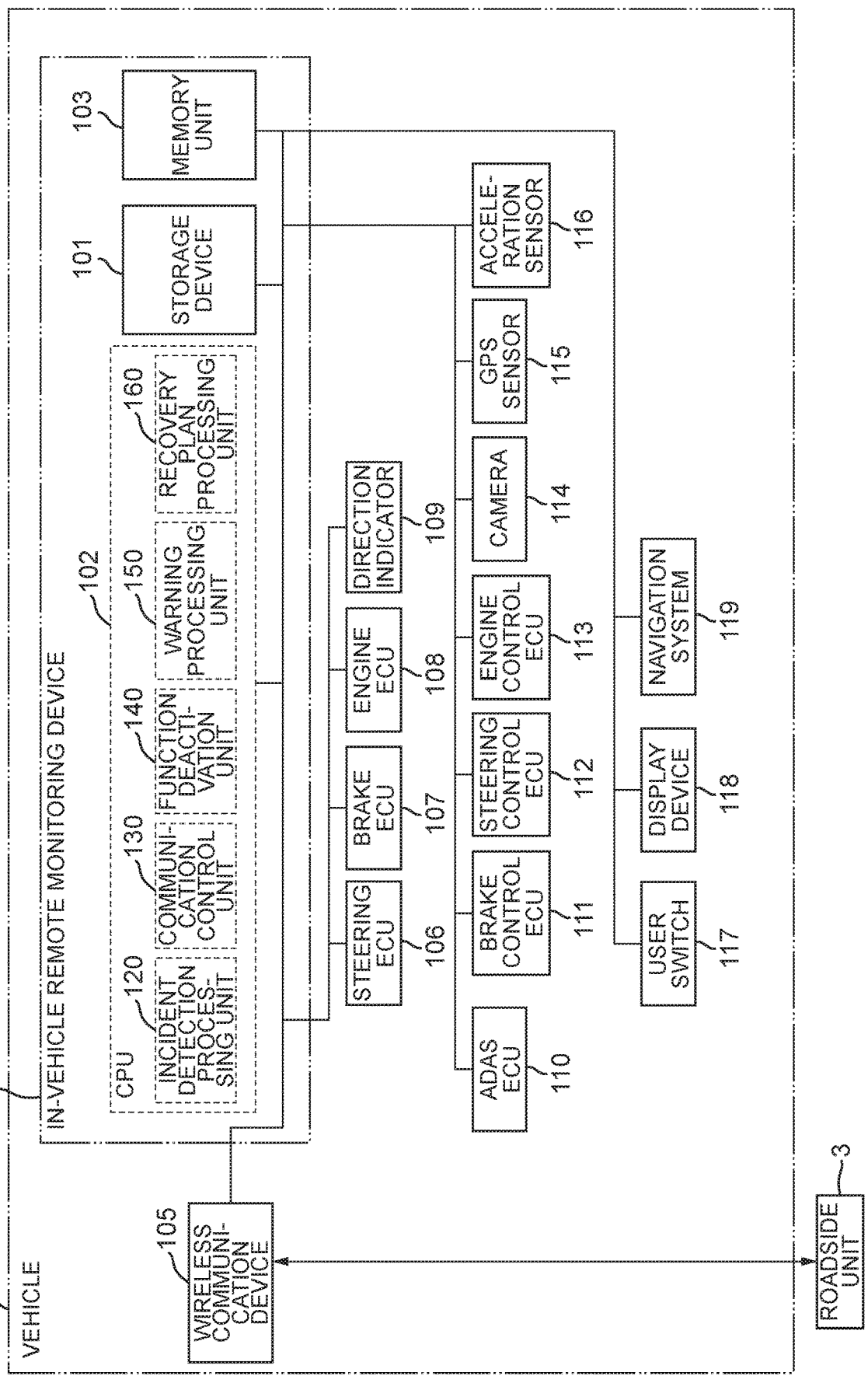
FIG. 2 is a block diagram illustrating the hardware configuration of the vehicle and the in-vehicle remote monitoring device.

FIG. 2 is a block diagram illustrating the hardware configuration of the vehicle 2 and the in-vehicle remote monitoring device 20. The vehicle 2 comprises an in-vehicle remote monitoring device 20, and a wireless communication device 105, a steering ECU 106, a brake ECU 107, an engine ECU 108, a direction indicator 109, an ADAS ECU 110, a brake control ECU 111, a steering control ECU 112, an engine control ECU 113, a camera 114, a GPS sensor 115, an acceleration sensor 116, a user switch 117, a display device 118, and a navigation system 119 which are respectively connected to the in-vehicle remote monitoring device 20.

The steering ECU 106, the brake ECU 107, the engine ECU 108, and the direction indicator 109 are units for performing the driving control of the vehicle 2, and configure a network by being mutually connected. In the ensuing explanation, this network is hereinafter referred to as the "control-based network domain". The ADAS ECU 110, the brake control ECU 111, the steering control ECU 112, the engine control ECU 113, the camera 114, the GPS sensor 115, and the acceleration sensor 116 are units for performing the driver assistance or automated driving of the vehicle 2, and configure a network by being mutually connected. In the ensuing explanation, this network is hereinafter referred to as the "driver assistance-based network domain". The user switch 117, the display device 118, and the navigation system 119 are units for providing a user interface to the driver of the vehicle 2, and configure a network by being mutually connected. In the ensuing explanation, this network is hereinafter referred to as the "information-based network domain". In other words, the in-vehicle remote monitoring device 20 is connected to the control-based network domain, the driver assistance-based network domain, and the information-based network domain, and perform data communication with the respective units within these networks.

In each of the foregoing networks, the respective units within the same network can directly perform data communication without going through the in-vehicle remote monitoring device 20. For example, communication for performing the driving control of the vehicle 2 is performed in the control-based network domain. Communication for the driver assistance or automated driving of the vehicle 2 is performed in the driver assistance-based network domain. Communication for the user interface to be provided to the driver of the vehicle 2 is performed in the information-based network domain. Meanwhile, data communication between units belonging to different networks is performed via the in-vehicle remote monitoring device 20.

The wireless communication device 105 is connected to the in-vehicle remote monitoring device 20, and performs wireless communication with the roadside unit 3. The in-vehicle remote monitoring device 20 performs data communication with the roadside unit 3 based on wireless communication via the wireless communication device 105.

The steering ECU 106 is a unit for performing the traveling direction control by controlling the steering mechanism of the vehicle according to the steering operation of the driver of the vehicle 2 or the steering control instruction sent from the steering control ECU 112. The brake ECU 107 is a unit for performing the deceleration control by controlling the brake of the vehicle 2 according the brake operation of the driver of the vehicle 2 or the brake control instruction sent from the brake control ECU 111. The engine ECU 108 is a unit for performing the speed control by controlling the engine of the vehicle 2 according to the running state of the vehicle 2 or the engine control instruction sent from the engine control ECU 113. The direction indicator 109 is a unit for lighting the signal provided to the vehicle 2 and notifying the other vehicles nearby, when the vehicle 2 is to make a turn, of the direction of such turn according to the direction instruction operation of the driver of the vehicle 2 or the direction instruction order sent from the ADAS ECU 110. The driving control of the vehicle 2 is performed based on these units.

The ADAS ECU 110 is a unit for determining the acceleration, deceleration, or stop of the vehicle 2 based on internal and external information of the vehicle 2, and realizing the automated driving or driver assistance service of the vehicle 2 by using the determination result thereof. The ADAS ECU 110 determines the behavior of the vehicle 2 by referring to the external images acquired from the camera 114, the position of the vehicle 2 acquired from the GPS sensor 115, the acceleration of the vehicle 2 acquired from the acceleration sensor 116, and the peripheral map information of the vehicle 2 retained by the navigation system 119. Subsequently, the ADAS ECU 110 instructs the brake control ECU 111, the steering control ECU 112, and the engine control ECU 113 to respectively output control instructions according to the determined behavior of the vehicle 2. The ADAS ECU 110 thereby automatically performs all operations of acceleration, steering and braking of the vehicle 2, and realizes the automated driving function of the vehicle 2.

A user as the driver of the vehicle 2 can cause the vehicle 2 to automatically drive to the intended destination without having to perform driving operations by using the automated driving function of the ADAS ECU 110. For example, when the vehicle 2 is traveling to the destination while maintaining the same driving lane, the ADAS ECU 110 confirms whether there is any obstacle in front of and behind the vehicle 2 based on the external images acquired from the camera 114. Note that radar sensors (not shown) may also be used in substitute for the camera 114. Moreover, the ADAS ECU 110 determines the traveling direction and the driving speed of the vehicle 2 according to the shape of the driving lane based on the map information acquired from the navigation system 119, and respectively sends, to the brake control ECU 111, the steering control ECU 112, and the engine control ECU 113, vehicle information including the control parameters according to the foregoing values. It is thereby possible to cause the vehicle 2 to automatically drive along the driving lane. Furthermore, for example, when the vehicle 2 is to change lanes while performing automated driving, the ADAS ECU 110 controls the operation of the direction indicator 109 and lights the direction indicator 109 in the direction of making the lane change. Moreover, the ADAS ECU 110 confirms the existence of obstacles on the new lane to be used and determines the behavior of the vehicle 2 upon making the lane change based on the external images acquired from the camera 114, and respectively sends, to the brake control ECU 111, the steering control ECU 112, and the engine control ECU 113, vehicle information including the control parameters according to the foregoing values. It is thereby possible to cause the vehicle 2 to automatically change lanes.

The brake control ECU 111 is a unit which sends a brake control instruction, including the braking strength, to the brake ECU 107 according to the instruction of the ADAS ECU 110. The steering control ECU 112 is a unit which sends a steering control instruction, including the steering operation angle, to the steering ECU 106 according to the instruction of the ADAS ECU 110. The engine control ECU 113 is a unit which sends an engine control instruction, including the rpm of the engine, to the engine ECU 108 according to the instruction of the ADAS ECU 110. The camera 114 is a unit which outputs, to the ADAS ECU 110, images that captured the periphery of the vehicle 2. The GPS sensor 115 is a positioning unit which receives signals from a satellite and determines the position of the vehicle 2. The acceleration sensor 116 is a unit which detects the acceleration of the vehicle 2 in the front-back direction and the left-right direction. The driver assistance and automated driving of the vehicle 2 are performed based on these units.

The user switch 117 is a unit which detects a predetermined input operation of the driver of the vehicle 2. A user as the driver of the vehicle 2 uses the user switch 117, for example, upon switching the automated driving or the driver assistance function of the vehicle 2 from a disabled state to an enabled state, or from an enabled state to a disabled state. The display device 118 is, for example, a liquid crystal monitor or the like, and displays various types of information to the driver. For example, when the vehicle 2 is performing automated driving or driver assistance, the driver can comprehend the status of the vehicle 2 by displaying a message on the display device 18 to the effect that such function has been enabled. The navigation system 119 is a unit which retains map information such as the road shape, and provides map information around the vehicle 2 according to a request from the user or the ADAS ECU 110. The user interface is provided to the driver of the vehicle 2 based on these units.

The in-vehicle remote monitoring device 20 comprises a storage device 101, a CPU 102, and a memory unit 103. The storage device 101 is, for example, an auxiliary storage device such as an HDD or a flash memory. The CPU 102 controls the in-vehicle remote monitoring device 20 by reading and executing, for example, predetermined control programs stored in the storage device 101 or the like.

The memory unit 103 is a main storage device that is used by the CPU 102 upon executing control programs.

The CPU 102 functionally comprises an incident detection processing unit 120, a communication control unit 130, a function deactivation unit 140, a warning processing unit 150, and a recovery plan processing unit 160. In other words, the incident detection processing unit 120, the communication control unit 130, the function deactivation unit 140, the warning processing unit 150, and the recovery plan processing unit 160 are realized via software based on the control programs executed by the CPU 102. The incident detection processing unit 120, the communication control unit 130, the function deactivation unit 140, the warning processing unit 150, and the recovery plan processing unit 160 will be described later in detail.

Note that the incident detection processing unit 120, the communication control unit 130, the function deactivation unit 140, the warning processing unit 150, and the recovery plan processing unit 160 may also be respectively configured, for example, from an electronic circuit such as an FPGA capable of realizing functions that are equivalent to those of the CPU 102.

Figure 3:
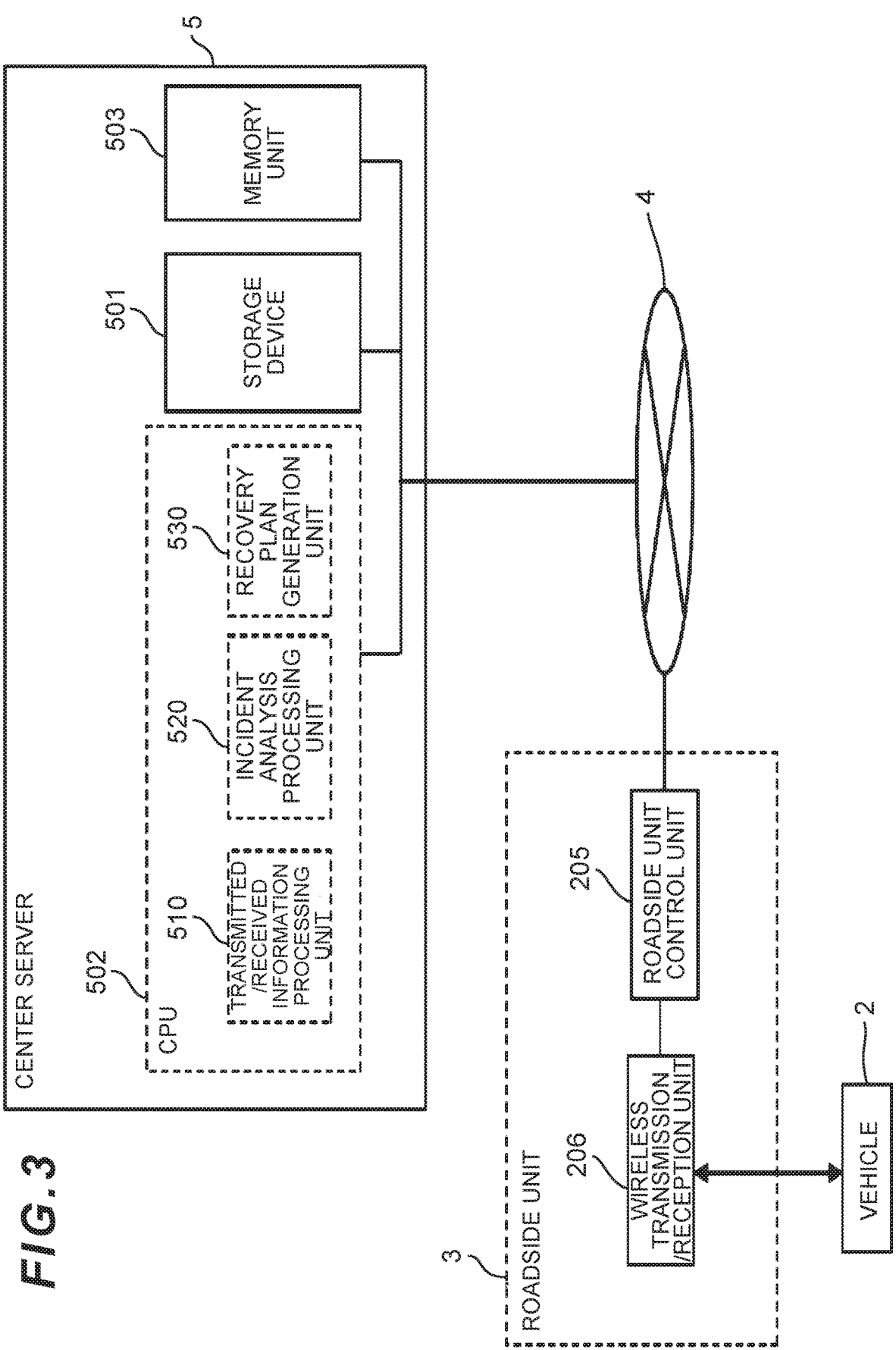
FIG. 3 is a block diagram illustrating the hardware configuration of the roadside unit and the center server.

FIG. 3 is a block diagram illustrating the hardware configuration of the roadside unit 3 and the center server 5. The roadside unit 3 comprises a roadside unit control unit 205 and a wireless transmission/reception unit 206.

The wireless transmission/reception unit 206 performs data communication with the in-vehicle remote monitoring device 20 equipped in the vehicle 2 by sending and receiving wireless signals. The roadside unit control unit 205 controls the roadside unit 3. The roadside unit control unit 205 is connected to the network 4. The roadside unit control unit 205 performs data communication with the center server 5 via the network 4. The roadside unit control unit 205 controls the wireless transmission/reception unit 206 and sends information, which was sent from the center server 5, to the vehicle 2, and sends information, which was received from the vehicle 2, to the center server 5.

The center server 5 comprises a storage device 501, a CPU 502, and a memory unit 503. The storage device 501 is, for example, an auxiliary storage device such as an HDD or a flash memory. The CPU 502 processes information sent to and received from the roadside unit 3 by reading and executing, for example, predetermined control programs stored in the storage device 501 or the like. The memory unit 503 is a main storage device that is used by the CPU 502 upon executing control programs.

The CPU 502 functionally comprises a transmitted/received information processing unit 510, an incident analysis processing unit 520, and a recovery plan generation unit 530. In other words, the transmitted/received information processing unit 510, the incident analysis processing unit 520, and the recovery plan generation unit 530 are realized via software based on the control programs executed by the CPU 502. The transmitted/received information processing unit 510, the incident analysis processing unit 520, and the recovery plan generation unit 530 will be described later in detail.

The functional configuration of the in-vehicle remote monitoring device 20 and the center server 5 is now explained.

Figure 4:
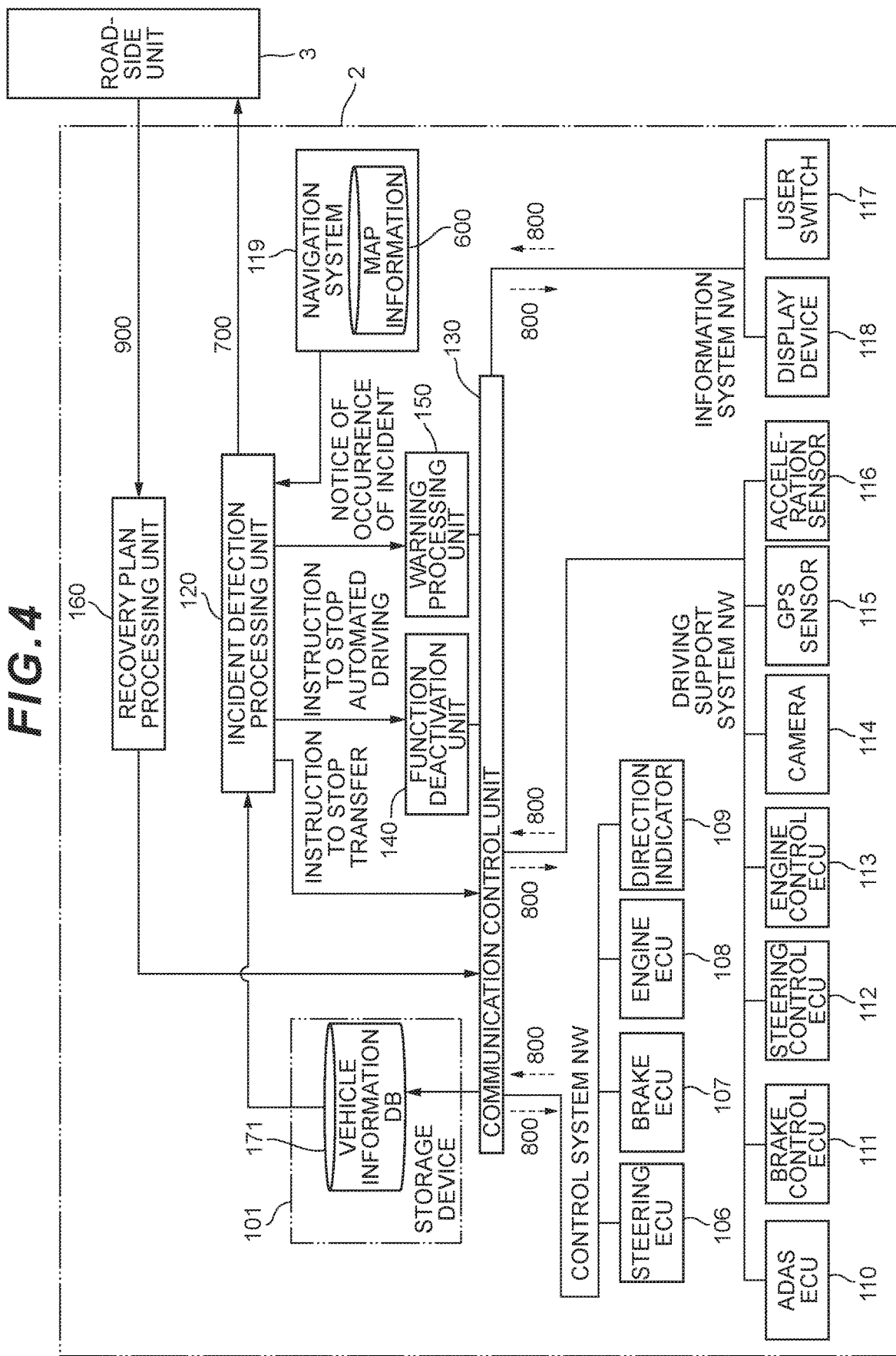
FIG. 4 is a block diagram illustrating the functional configuration of the in-vehicle remote monitoring device.

FIG. 4 is a block diagram illustrating the functional configuration of the in-vehicle remote monitoring device 20. The storage device 101 includes a vehicle information DB 171.

The recovery plan processing unit 160 uses the wireless communication device 105 to communicate with the roadside unit 3, and receives a recovery plan 900 from the center server 5 via the roadside unit 3. The received recovery plan 900 is output to the communication control unit 130. The recovery plan 900 is information that is sent from the center server 5, in cases where a security incident occurs as a result of any one of the devices in the foregoing control-based network domain, driver assistance-based network domain or information-based network domain encounters a cyberattack, to recover the unit that encountered the incident. The recovery plan 900 includes, for example, the backdate order and configuration file of the software running on that device, and update software.

The incident detection processing unit 120 detects the occurrence of an incident based on the vehicle information stored in the vehicle information DB 171, and the map information 600 stored in the navigation system 119. When the occurrence of an incident is detected, the incident detection processing unit 120 uses the wireless communication device 105 to communicate with the roadside unit 3, and sends incident information 700 related to the detected incident to the center server 5 via the roadside unit 3. The incident information 700 includes the location where the incident was detected, software version of the device of the information source when the incident was detected, cause of the incident, and date and time that the incident was detected. Moreover, when the occurrence of an incident is detected, the incident detection processing unit 120 respectively outputs, to the communication control unit 130, the function deactivation unit 140, and the warning processing unit 150, a transfer stop instruction for instructing the stop of information transfer between different networks, an automated driving deactivation instruction for instructing the deactivation of the automated driving of the vehicle 2, and an incident notice for notifying the occurrence of an incident.

The communication control unit 130 relays the communication between the respective networks connected to the in-vehicle remote monitoring device 20. For example, the communication control unit 130 transfers a brake control instruction sent from the brake control ECU 111 of the driver assistance-based network domain to the brake ECU 107 of the control-based network domain between these networks.

Communication between units within the same network and between units within different networks is performed based on the vehicle information packet 800 described later. When the communication control unit 130 receives the vehicle information packet 800 to be sent and received between the respective units, information included in such packet is added to the vehicle information DB 171 as the vehicle information representing the control state of the vehicle 2. In other words, the vehicle information DB 171 stores information included in the vehicle information packet 800 as vehicle information in chronological order.

When the communication control unit 130 receives the recovery plan 900 from the recovery plan processing unit 160, the communication control unit 130 sends the received recovery plan 900 to the destination device. Moreover, when the communication control unit 130 receives a transfer stop instruction from the incident detection processing unit 120, the communication control unit 130 blocks the communication between the respective units belonging to different networks.

When the function deactivation unit 140 receives the automated driving deactivation instruction from the incident detection processing unit 120, the function deactivation unit 140 deactivates the automated driving function of the vehicle 2. The function deactivation unit 140 deactivates the automated driving function of the vehicle 2, for example, by instructing the communication control unit 130 to block the transfer of information from the respective units of the driver assistance-based network to the respective units of the control-based network, or instructing the ADAS ECU 110 to deactivate the automated driving function via the communication control unit 130.

When the warning processing unit 150 receives an incident notice from the incident detection processing unit 120, the warning processing unit 150 uses the display device 118 and warns the user as the driver of the vehicle 2. The warning processing unit 150 instructs the user to perform a switching operation of switching from automated driving to manual driving by using the user switch 117, for example, by displaying a predetermined screen on the display device 118. When a switching operation is input using the user switch 117, the warning processing unit 150 notifies the incident detection processing unit 120 to such effect.

Figure 5:
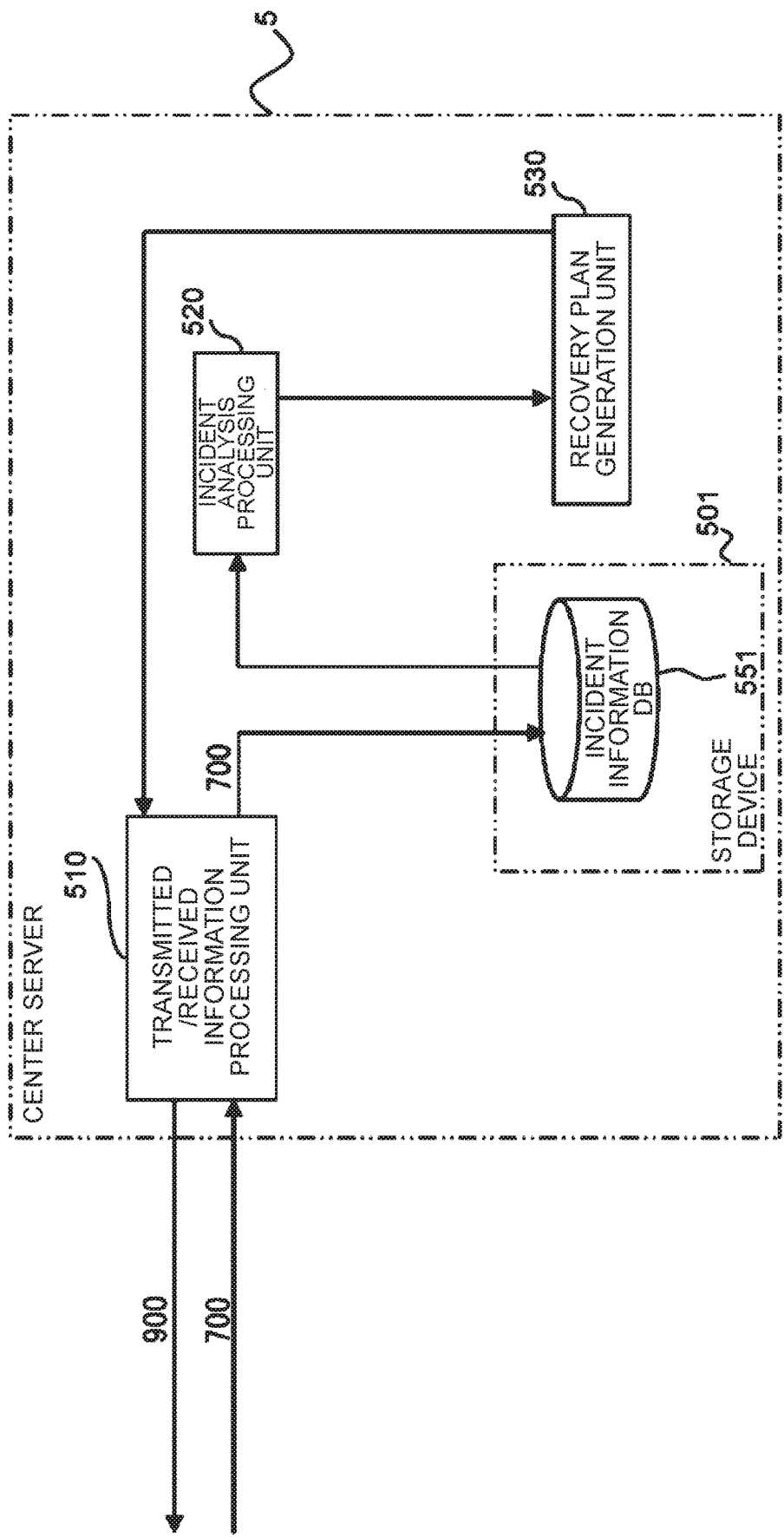
FIG. 5 is a block diagram illustrating the functional configuration of the center server.

FIG. 5 is a block diagram illustrating the functional configuration of the center server 5. The storage device 501 includes an incident information DB 551.

The transmitted/received information processing unit 510 sends and receives information to and from the roadside unit 3. For example, the transmitted/received information processing unit 510 receives the incident information 700, which was sent from the vehicle 2, via the roadside unit 3. The transmitted/received information processing unit 510 stores the incident information 700, which was received from the vehicle 2, in the incident information DB 551.

The incident analysis processing unit 520 analyzes the incident information 700 stored in the incident information DB 551, and notifies the analytical result thereof to the recovery plan generation unit 530.

The recovery plan generation unit 530 generates the recovery plan 900 corresponding to the incident that occurred in the vehicle 2 based on the analytical result of the incident analysis processing unit 520. The transmitted/received information processing unit 510 sends the recovery plan 900 generated by the recovery plan generation unit 530 to the vehicle 2 via the roadside unit 3.

FIG. 6 is an explanatory diagram illustrating the configuration of the map information 600. The map information 600 includes the respective types of information of link ID 601, speed limit 602, direction constraint 603, first latitude information 604, second latitude information 605, first longitude information 606, and second longitude information 607.

The link ID 601 represents the link ID assigned to each road link. With which road link the map information corresponds is identified based on the value of the link ID 601. Note that the values of the link ID are each pre-set to a unique value for each road link so that they do not mutually overlap.

The speed limit 602 represents the speed limit that is set to the road link corresponding to the map information. The upper limit of the driving speed during the automated driving of the vehicle 2 is set according to the value of the speed limit 602.

The direction constraint 603 represents the direction of the road link corresponding to the map information. The direction constraint 603 is expressed as an angle in which a predetermined direction (for example, magnetic north direction) is 0.

The first latitude information 604 is a latitude value representing the position of the road link corresponding to the map information. The second latitude information 605 is information representing whether the value of the first latitude information 604 indicates the north latitude (N) or the south latitude (S). The first longitude information 606 is a longitude value representing the position of the road link corresponding to the map information. The second longitude information 607 is information representing whether the value of the first longitude information 606 indicates the east longitude (E) or the west longitude (W).

Figure 7:
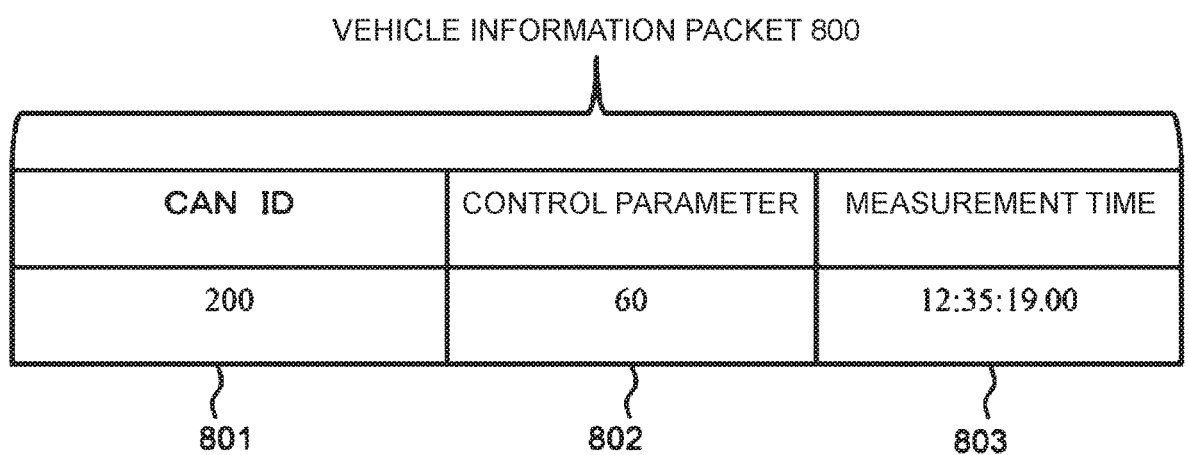
FIG. 7 is an explanatory diagram illustrating the configuration of the in-vehicle information packet.

FIG. 7 is an explanatory diagram illustrating the configuration of the vehicle information packet 800. The vehicle information packet 800 includes the respective types of information of CAN ID 801, control parameter 802, and measurement time 803.

The CAN ID 801 is information indicating the CAN ID that is set to the source of the vehicle information packet 800. A unique number for each device is pre-set as the CAN ID to the respective units within the network. Each device sets, as the CAN ID 801, information indicating its own CAN ID upon sending the vehicle information packet 800.

The control parameter 802 is information representing the control value to be used in the control to be performed by the device that received the vehicle information packet 800. The control parameter 802 is set with various values according to the content of the control to be performed by the respective units. For example, information such as the accelerator position, the brake pressure, the steering angle, and the engine rpm can be represented with the control parameter 802. Moreover, the control parameter 802 may also include information representing the operational status of the direction indicator 109, and the captured image data of the camera 114.

The measurement time 803 is information representing the time (time of day) that the vehicle information packet 800 was sent. Upon sending the vehicle information packet 800, each device sets, as the measurement time 803, information indicating the time that the vehicle information packet 800 was sent.

Figure 8:
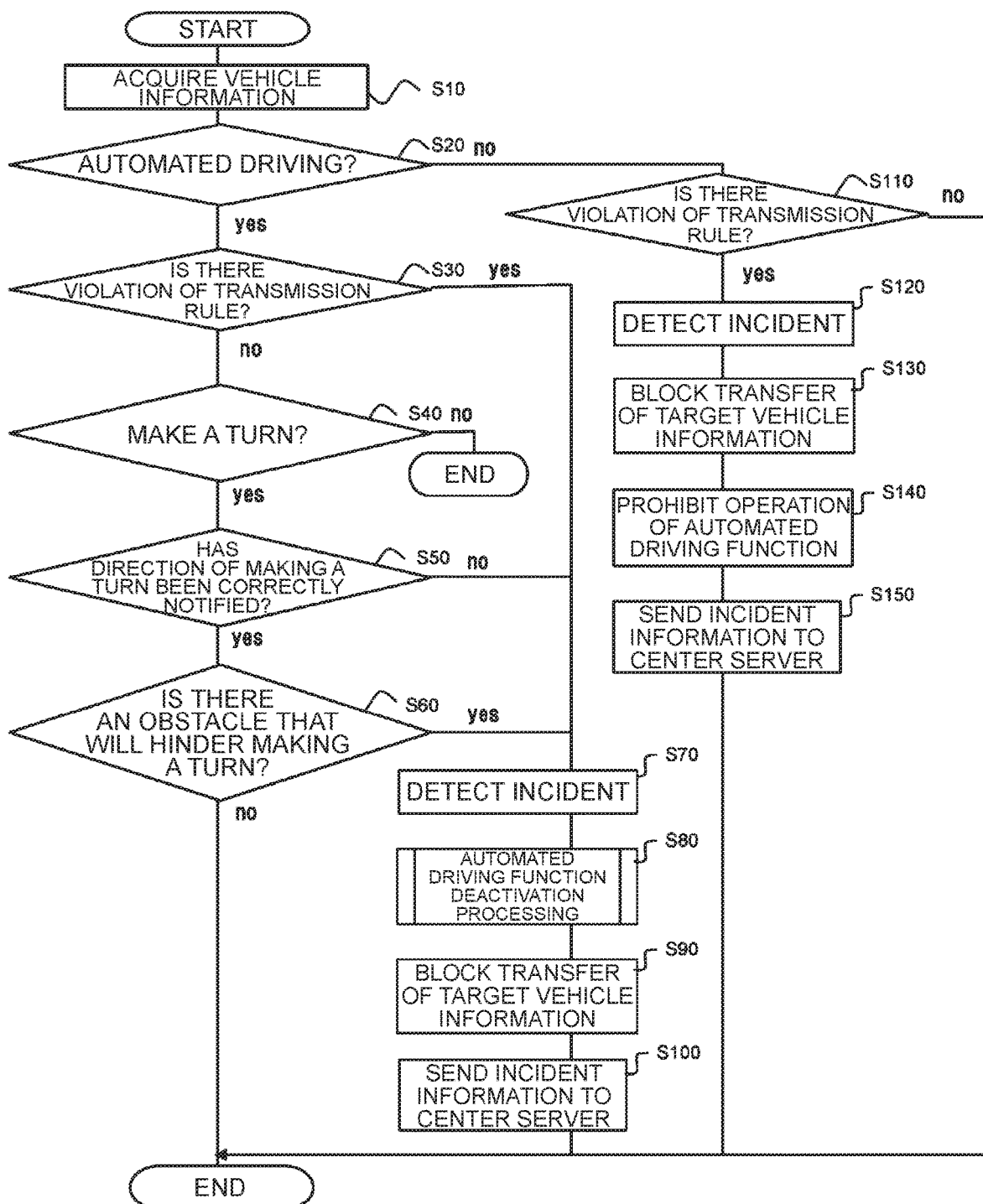
FIG. 8 is a flowchart of the vehicle information monitoring processing executed by the in-vehicle remote monitoring device.

FIG. 8 is a flowchart of the vehicle information monitoring processing executed by the CPU 102 of the in-vehicle remote monitoring device 20. The processing shown in this flowchart is executed once in predetermined intervals by the CPU 102 of the in-vehicle remote monitoring device 20 mounted in the vehicle 2.

In step S10, the CPU 102 uses the incident detection processing unit 120 to acquire the vehicle information accumulated in the vehicle information DB 171 by reading such vehicle information from the vehicle information DB 171. Here, it is preferable to exclude any vehicle information that has been previously acquired in the past processing, and extract and acquire only vehicle information that has not yet been acquired.

In step S20, the CPU 102 uses the incident detection processing unit 120 to determine whether the vehicle 2 is currently engaged in automated driving based on the vehicle information acquired in step S10. When the vehicle 2 is engaged in automated driving, the CPU 102 advances the processing to step S30, and when the vehicle 2 is not engaged in automated driving; that is, when the user is manually driving the vehicle 2, the CPU 102 advances the processing to step S110.

In step S30, the CPU 102 uses the incident detection processing unit 120 to determine whether the vehicle information acquired in step S10 is violating a predetermined transmission rule. Consequently, the CPU 102 advances the processing to step S70 when it is determined that the vehicle information is violating the transmission rule, and advances the processing to step S40 when it is determined that the vehicle information is not violating the transmission rule. Specifically, for example, the determination of step S30 is performed by confirming whether the value of the CAN ID 801 is included in a pre-registered number list, confirming whether the value of the control parameter 802 is within a pre-set range, and whether the difference between the value of the measurement time 803 and the current time is less than a pre-set threshold. Note that, in the in-vehicle remote monitoring device 20, the foregoing criterion values; that is, the number list of the CAN ID 801, the setting range of the control parameter 802, and the threshold of the difference between the measurement time 803 and the current time are pre-set as transmission rules.

In step S40, the CPU 102 determines whether the vehicle 2 will make a turn based on the vehicle information acquired in step S10 by the incident detection processing unit 120. Consequently, the CPU 102 advances the processing to step S50 when it is determined that the vehicle 2 will make a turn, and ends the vehicle information monitoring processing of FIG. 8 when it is determined that the vehicle 2 will not make a turn. Specifically, for example, it is determined that the vehicle 2 will make a turn when the value of the control parameter 802 in the vehicle information represents a steering angle of a predetermined angle or more. Moreover, whether the vehicle 2 will make a turn may also be determined based on the map information 600 equipped in the navigation system 119. For example, whether the vehicle 2 will make a turn is determined by obtaining the direction of the road on which the vehicle 2 is traveling from the map information 600, and comparing such direction with the vehicle information representing the steering angle, position, and acceleration of the vehicle 2. Furthermore, here, the captured images of the camera 114 may also be used. Other various methods may also be used for the determination of step S40. Note that the expression "make a turn" includes, for example, deviation from the driving lane and a right/left turn at an intersection.

In step S50, the CPU 102 uses the incident detection processing unit 120 to determine whether the direction of the turn to be made by the vehicle 2 is being correctly notified based on the vehicle information acquired in step S10. Consequently, the CPU 102 advances the processing to step S60 when it is determined that the direction of the turn to be made by the vehicle 2 is being correctly notified, and advances the processing to step S70 when it is determined that the direction of the turn to be made by the vehicle 2 is not being correctly notified. Specifically, for example, the determination of step S50 can be performed by confirming the operational status of the direction indicator 109 from the value of the control parameter 802 in the vehicle information, and determining whether the direction indicator 109 is correctly indicating the direction of the turn to be made by the vehicle 2 determined in step S40 by the direction indicator 109.

In step S60, the CPU 102 uses the incident detection processing unit 120 to determine whether there is an obstacle which will hinder the making of the turn by the vehicle 2 based on the vehicle information acquired in step S10. Consequently, the CPU 102 advances the processing to step S70 when it is determined that there is an obstacle, and ends the vehicle information monitoring processing of FIG. 8 when it is determined that there is no such obstacle. Specifically, for example, whether another vehicle or an object that will hinder the making of the turn by the vehicle 2 exists around the vehicle 2 is determined based on the vehicle information representing the image information acquired by the camera 114. Consequently, if there is another vehicle or an object that will hinder the making of the turn by the vehicle 2, such other vehicle or object is recognized as an obstacle. Here, radar sensors (not shown) may also be used in substitute for the camera 114, or concurrently with the camera 114.

In step S70, the CPU 102 uses the incident detection processing unit 120 to detect an incident. In other words, the CPU 102 detects, as an incident that occurred in the vehicle 2, an event such as a violation of the transmission rule by the vehicle information determined in step S30, a notice of an improper direction of making a turn determined in step S50, an existence of an obstacle upon making a turn determined in step S60.

In step S80, the CPU 102 executes the automated driving function deactivation processing for deactivating the automated driving function of the vehicle 2. Details of this automated driving function deactivation processing will be explained later with reference to FIG. 9.

In step S90, the CPU 102 uses the communication control unit 130 to block the transfer of specific vehicle information to other networks. Here, the incident detection processing unit 120 outputs a transfer stop instruction to the communication control unit 130. The communication control unit 130 that received the transfer stop instruction from the incident detection processing unit 120, for example, blocks the transfer of the vehicle information including the CAN ID of the respective units belonging to the driver assistance-based network to the other networks.

In step S100, the CPU 102 uses the incident detection processing unit 120 to output the incident information 700 related to the detected incident to the wireless communication device 105, and sends the incident information 700 to the center server via the roadside unit 3. After executing step S100, the CPU 102 ends the vehicle information monitoring processing of FIG. 8.

When the vehicle 2 is not engaged in automated driving, in step S110, the CPU 102 uses the incident detection processing unit 120 to determine whether the vehicle information acquired in step S10 is violating predetermined transmission rule.

Consequently, the CPU 102 advances the processing to step S120 when it is determined that the vehicle information is breaching the transmission rule, and ends the vehicle information monitoring processing of FIG. 8 when it is determined that the vehicle information is not breaching the transmission rule. Note that the determination of step S110 may be performed in the same manner as step S30.

In step S120, the CPU 102 uses the incident detection processing unit 120 to detect an incident. In other words, the CPU 102 detects the violation of the termination rule by the vehicle information determined in step S110 as an incident that occurred in the vehicle 2.

In step S130, the CPU 102 uses the communication control unit 130 to block the transfer of specific vehicle information to the other networks of such vehicle information in the same manner as step S90.

In step S140, the CPU 102 uses the function deactivation unit 140 to prohibit the operation of the automated driving function in the vehicle 2. Here, the incident detection processing unit 120 outputs an automated driving deactivation instruction to the function deactivation unit 140. The function deactivation unit 140 that received the automated driving deactivation instruction from the incident detection processing unit 120, for example, prohibits the operation of the automated driving function by instructing the ADAS ECU 110 to prohibit the operation of the automated driving function via the communication control unit 130.

In step S150, the CPU 102 uses the incident detection processing unit 120 to output the incident information 700 related to the detected incident to the wireless communication device 105, and sends the incident information 700 to the center server via the roadside unit 3. After executing step S150, the CPU 102 ends the vehicle information monitoring processing of FIG. 8.

Figure 9:
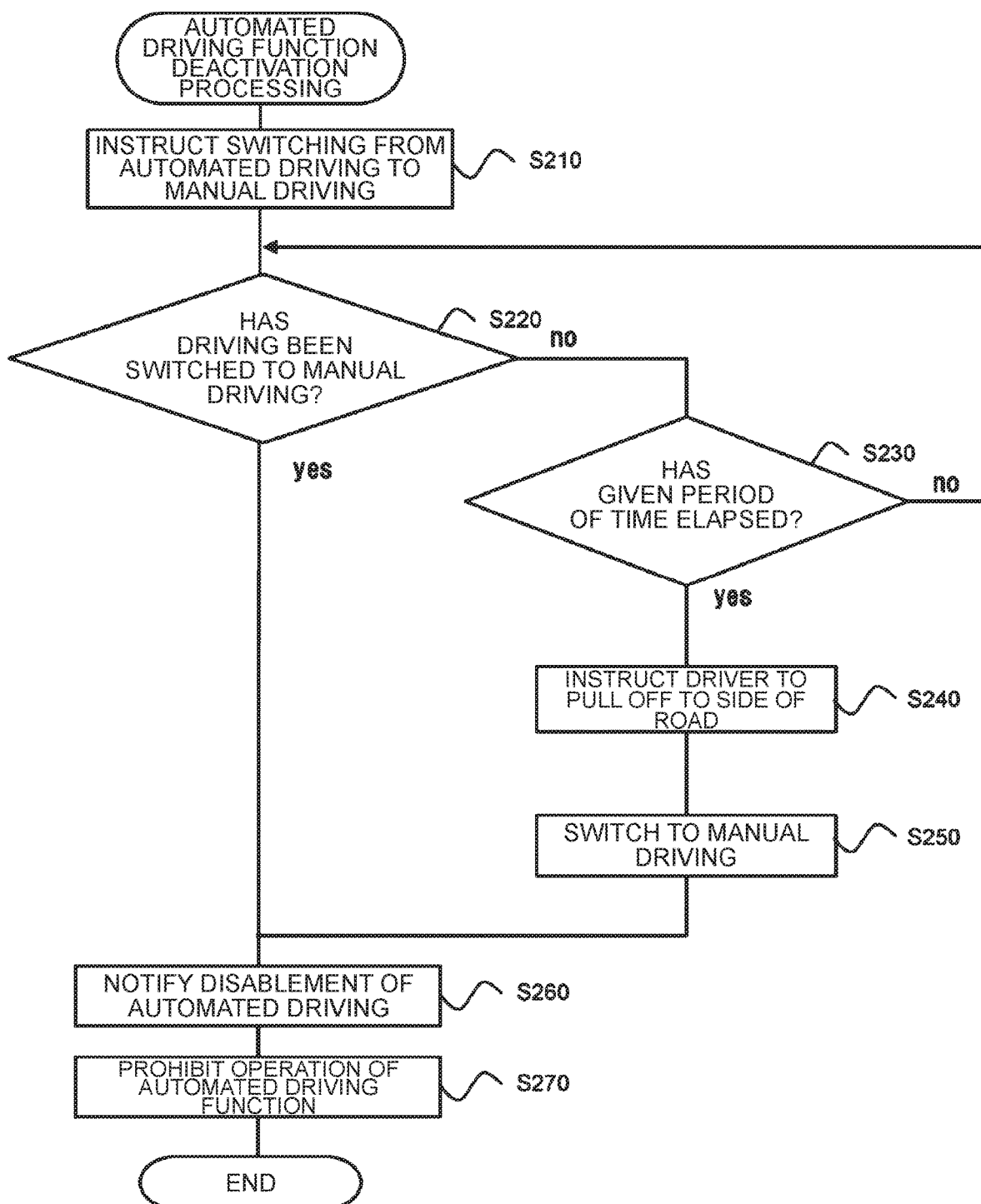
FIG. 9 is a flowchart of the automated driving function deactivation processing.

FIG. 9 is a flowchart of the automated driving function deactivation processing executed in step S80 of FIG. 8.

In step S210, the CPU 102 uses the warning processing unit 150 to instruct the user as the driver of the vehicle 2 to switch from automated driving to manual driving. Here, the incident detection processing unit 120 outputs an incident notice to the warning processing unit 150. The warning processing unit 150 that received the incident notice from the incident detection processing unit 120, for example, urges the user to switch from automated driving to manual driving by instructing the display device 118 to display a predetermined screen via the communication control unit 130.

In step S220, the CPU 102 determines whether the control state has been switched from automated driving to manual driving. When the automated driving function of the ADAS ECU 110 is deactivated as a result of the user performing a predetermined switching operation using the user switch 117 according to the instruction of step S210, it is determined that the control state has been switched from automated driving to manual driving, and the CPU 102 advances the processing to step S260. Meanwhile, when a switching operation is not input using the user switch 117, it is determined that the control state has not been switched from automated driving to manual driving, and the CPU 102 advances the processing to step S230.

In step S230, the CPU 102 determines whether a given period of time, such as 10 seconds, has elapsed from the time that the user was instructed to switch to manual driving in step S210. The CPU 102 advances the processing to step S240 if a given period of time has elapsed, and returns to step S220 if a given period of time has not elapsed.

In step S240, the CPU 102 instructs the ADAS ECU 110 to stop the vehicle 2 on a road shoulder. Note that the vehicle 2 may be stopped at a location other than the road shoulder so as long as the vehicle 2 can be safely stopped. Consequently, if a predetermined switching operation is not performed using the user switch 117 within a given period of time from the time that the user was instructed to switch to manual driving in step S210, the CPU 102 instructs the ADAS ECU 110 to stop the vehicle 2 at a safe location.

In step S250, the CPU 102 switches the control state of the vehicle 2 from automated driving to manual driving. For example, the CPU 102 outputs an instruction for deactivating the automated driving function from the function deactivation unit 140 to the ADAS ECU 110. The ADAS ECU 110 that received the foregoing instruction can no longer use the automated driving function as a result of prohibiting the brake control ECU 111, the steering control ECU 112, and the engine control ECU 113 from outputting control instructions related to the acceleration, steering and braking of the vehicle 2. After executing step S250, the CPU 102 advances the processing to step S260.

In step S260, the CPU 102 uses the warning processing unit 150 to notify the user that automated driving cannot be used. Here, the warning processing unit 150 notifies the user that automated driving cannot be used due to the occurrence of an incident, for example, by causing the display device 118 to display a predetermined message via the communication control unit 130.

In step S270, the CPU 102 uses the function deactivation unit 140 to prohibit the operation of the automated driving function in the vehicle 2. Here, the function deactivation unit 140 prohibits the operation of the automated driving function, in the same manner as step S140 of FIG. 8, for example, by instructing the ADAS ECU 110 to prohibit the operation of the automated driving function via the communication control unit 130. After executing step S270, the CPU 102 ends the automated driving function deactivation processing of FIG. 9.

Figure 10:
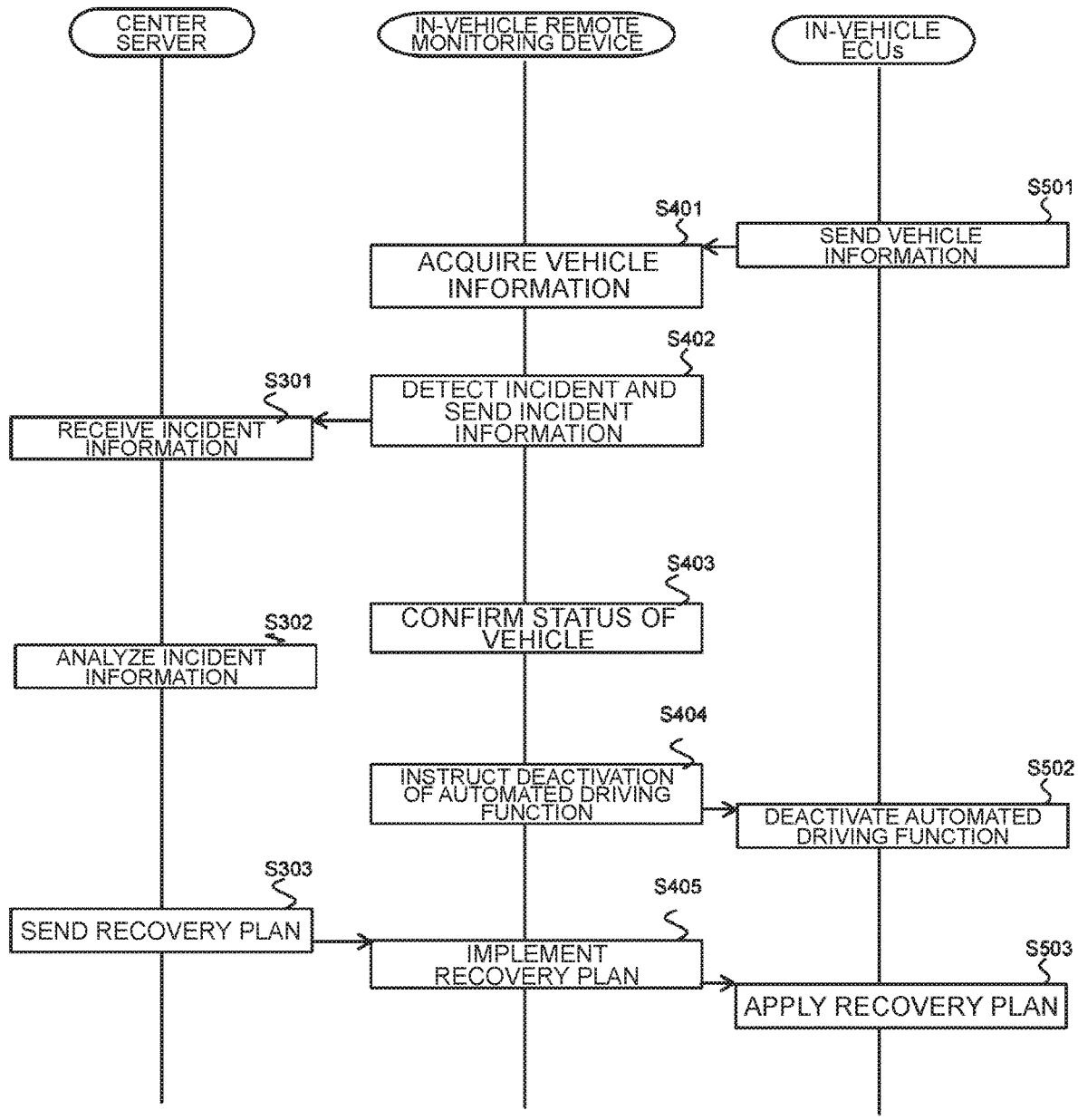
FIG. 10 is a sequence diagram of the vehicle communication network system.

The operation of the overall vehicle information network system 1 is now explained. FIG. 10 is a sequence diagram showing the operation of the overall vehicle information network system 1. In the vehicle information network system 1, the center server 5, the in-vehicle remote monitoring device 20, and the respective units within the network respectively execute the processing shown in FIG. 10.

In step S301, the center server 5 receives the incident information 700 sent from the in-vehicle remote monitoring device 20 via the roadside unit 3, and stores the received incident information 700 in the incident information DB 551.

In step S302, the center server 5 uses the incident analysis processing unit 520 to analyze the incident information 700. Here, for example, the location where an anomaly occurred in the vehicle 2 is identified and the cause thereof is analyzed.

In step S303, the center server 5 uses the recovery plan generation unit 530 to generate the recovery plan 900 including the program correction patch and backdate instruction based on the result of the analysis of the incident information performed in step S302. Subsequently, the center server 5 sends the generated recovery plan 900 to the in-vehicle remote monitoring device 20 via the roadside unit 3.

In step S401, the in-vehicle remote monitoring device 20 receives the vehicle information packet 800 sent from the respective units of the network. Subsequently, the in-vehicle remote monitoring device 20 accumulates the received vehicle information packet 800 in the vehicle information DB 171, and performs inter-domain communication to be transferred to the other networks as needed according to the destinated destination.

When an incident occurs, in step S402, the in-vehicle remote monitoring device 20 detects the incident by performing the vehicle information monitoring processing of FIG. 8, and sends the incident information 700 to the center server 5.

In step S403, the in-vehicle remote monitoring device 20 confirms the status of the vehicle 2, and determines whether the vehicle 2 is currently engaged in automated driving.

When it is determined in step S403 that the vehicle 2 is currently engaged in automated driving, in step S404, the in-vehicle remote monitoring device 20 instructs the ADAS ECU 110 to deactivate the automated driving function by performing the automated driving function deactivation processing of FIG. 9.

In step S405, the in-vehicle remote monitoring device 20 receives the recovery plan 900 sent from the center server 5, and implements the recovery plan 900 to the device in which the incident occurred.

In step S501, the respective units of the steering ECU 106, the brake ECU 107, the engine ECU 108, and the direction indicator 109 in the control-based network domain, the respective units of the ADAS ECU 110, the brake control ECU 111, the steering control ECU 112, the engine control ECU 113, the camera 114, the GPS sensor 115, and the acceleration sensor 116 in the driver assistance-based network domain, and the respective units of the user switch 117 and the display device 118 in the information-based network domain send the vehicle information packet 800 to the other units.

In step S502, when the ADAS ECU 110 receives an instruction from the in-vehicle remote monitoring device 20 for deactivating the automated driving function, the ADAS ECU 110 deactivates the automated driving function.

In step S503, the respective units which are affected by the incident that occurred in the network of the vehicle 2 undergo the recovery plan 900 implemented by the in-vehicle remote monitoring device 20.

According to an embodiment of the present invention explained above, the following effects are yielded.

(1) An in-vehicle remote monitoring device 20 is mounted on a vehicle 2 capable of automated driving, and comprises an incident detection processing unit 120 which acquires vehicle information representing a control state of the vehicle 2, and detects an incident that occurred in the vehicle 2 based on the acquired vehicle information. As a result of adopting the foregoing configuration, an incident that occurred in the vehicle 2 can be detected reliably and quickly.

(2) The incident detection processing unit 120 detects the incident based on the vehicle in while the vehicle 2 is engaged in automated driving. Specifically, the incident detection processing unit 120 determines whether the vehicle information is violating a predetermined transmission rule (step S30), and detects the incident upon determining that the vehicle information is violating the transmission rule (step S70). Moreover, the incident detection processing unit 120 determines, when the vehicle 2 is to make a turn, whether a direction indicator 109 is indicating a direction of the turn to be made by the vehicle based on the vehicle information including information related to an operational status of the direction indicator 109 (step S50), and detects the incident upon determining that the direction indicator 109 is not indicating the direction of the turn to be made by the vehicle (step S70). Moreover, the incident detection processing unit 120 determines, when the vehicle 2 is to make a turn, whether an obstacle which will obstruct the vehicle 2 from making the turn exists based on the vehicle information including information related to objects existing around the vehicle 2 (step S60), and detects the incident upon determining that the obstacle exists (step S70). As a result of adopting the foregoing configuration, when an incident occurs while the vehicle 2 is engaged in automated driving, the incident can be detected reliably and quickly.

(3) The vehicle 2 is equipped with a map storage device, or a navigation system 119, storing map information 600. The incident detection processing unit 120 can determine, in step S40, whether the vehicle 2 will make a turn based on the map information 600 stored in the navigation system 119. As a result of adopting the foregoing configuration, when the vehicle 2 is to make a turn, such making of a turn by the vehicle 2 can be reliably detected.

(4) The incident detection processing unit 120 can also detect the incident based on the vehicle information while the vehicle 2 is engaged in manual driving. Specifically, the incident detection processing unit 120 determines whether the vehicle information is violating a predetermined transmission rule (step S110), and detects the incident upon determining that the vehicle information is violating the transmission rule (step S120). As a result of adopting the foregoing configuration, when an incident occurs while the vehicle 2 is engaged in manual driving, the incident can be detected reliably and quickly.

(5) The in-vehicle remote monitoring device 20 further comprises a function deactivation unit 140 which deactivates an automated driving function of the vehicle 2, and a warning processing unit 150 which issues a warning to a driver of the vehicle 2. The incident detection processing unit 120, upon detecting the incident while the vehicle 2 is engaged in automated driving, instructs the driver to perform a switching operation of switching from automated driving to manual driving by using the warning processing unit 150 (step S210), and thereafter causes the function deactivation unit 140 to deactivate the automated driving function (step S270). As a result of adopting the foregoing configuration, when an incident occurs in the vehicle 2, switching from automated driving to manual driving can be performed safely.

(6) Note that, when the switching operation is not performed within a given period of time after the instruction is given to the driver (step S230: Yes), the in-vehicle remote monitoring device 20 stopes the vehicle 2 at a safe place (step S240). As a result of adopting the foregoing configuration, the safety of the vehicle 2 can be secured even when the driver is unable to immediately engage in manual driving.

Note that the embodiments and various modified examples explained above are merely illustrative. The present invention is not limited to the foregoing embodiments so as long as the features of the present invention are not impaired, and other modes considered to fall within the technical scope of the present invention also fall within the scope of the present invention.

The disclosure of the following priority application is incorporated herein by way of reference.

Japanese Patent Application No. 168882 of 2017 (filed on Sep. 1, 2017)

REFERENCE SIGNS LIST

1 . . . vehicle information network system, 2 . . . vehicle, 3 . . . roadside unit, 4 . . . network, 5 . . . center server, 20 . . . in-vehicle remote monitoring device, 101 . . . storage device, 102 . . . CPU, 103 . . . memory unit, 105 . . . wireless communication device, 106 . . . steering ECU, 107 . . . brake ECU, 108 . . . engine ECU, 109 . . . direction indicator, 110 . . . ADAS ECU, 111 . . . brake control ECU, 112 . . . steering control ECU, 113 . . . engine control ECU, 114 . . . camera, 115 . . . GPS sensor, 116 . . . acceleration sensor, 117 . . . user switch, 118 . . . display device, 119 . . . navigation system

The invention claimed is:

1. An in-vehicle device to be mounted on a vehicle capable of automated driving for detecting an incident, comprising:
a storage device to store vehicle information including a data structure representing a control state of the vehicle and a data structure for an operational status of a direction indicator of the vehicle;
an incident detection processor including a central processing unit (CPU) and memory to access the storage device and retrieve the vehicle information control state of the vehicle, and detects an incident that occurred in the vehicle based on the vehicle information, wherein
the incident detection processor detects the incident based on the data structure representing a control state of the vehicle while the vehicle is engaged in automated driving, wherein
the incident detection processor determines whether the operational status of the direction indicator is indicating a direction of a turn to be made by the vehicle, based on a value of the data structure for the operational status of the direction indicator of the vehicle; and detects the incident upon determining that the data structure for the operational status of the direction indicator is not indicating the direction of the turn to be made by the vehicle, and wherein
upon detecting the incident while the vehicle is engaged in automated driving, the incident detection processor transmits a signal instructing a driver of the vehicle to switch from automated driving to manual driving.

2. The in-vehicle device according to claim 1, wherein the incident detection processor determines whether the vehicle information is violating a predetermined transmission rule, and detects the incident upon determining that the vehicle information is violating the predetermined transmission rule.

3. The in-vehicle device according to claim 1, wherein the vehicle information includes information related to objects existing around the vehicle, and wherein the processor processing unit determines, when the vehicle is to make a turn, whether an obstacle which will obstruct the vehicle from making the turn exists based on the vehicle information, and detects the incident upon determining that the obstacle exists.

4. The in-vehicle device according to claim 3, wherein the vehicle is equipped with a map storage device storing map information, and wherein the processor determines whether the vehicle will make a turn based on the map information stored in the map storage device.

5. The in-vehicle device according to claim 3,
wherein the vehicle is equipped with a map storage device storing map information, and wherein the incident detection processor determines whether the vehicle will make a turn based on the map information stored in the map storage device.

6. The in-vehicle device according to claim 1, wherein the processor detects the incident based on the vehicle information while the vehicle is engaged in manual driving.

7. The in-vehicle device according to claim 6, wherein the processor determines whether the vehicle information is violating a predetermined transmission rule, and detects the incident upon determining that the vehicle information is violating the predetermined transmission rule.

8. The in-vehicle device according to claim 1, further comprising: a function deactivation unit which deactivates an automated driving function of the vehicle; and a warning processing unit which issues a warning to a driver of the vehicle, wherein
the incident detection processor, upon detecting the incident while the vehicle is engaged in automated driving, instructs the driver to perform a switching operation of switching from automated driving to manual driving by using the warning processing unit, and thereafter causes the function deactivation unit to deactivate the automated driving function.

9. The in-vehicle device according to claim 8, wherein the vehicle is stopped at a safe place when the switching operation is not performed within a given period of time after the instruction is given to the driver.

10. An incident detecting method in an in-vehicle device mounted on a vehicle capable of automated driving, comprising:
storing vehicle information including a data structure representing a control state of the vehicle and a data structure for an operational status of a direction indicator of the vehicle;
detecting an incident that occurred in the vehicle based on the vehicle information based on the data structure representing a control state of the vehicle while the vehicle is engaged in automated driving, wherein
determining whether the operational status of the direction indicator is indicating a direction of a turn to be made by the vehicle, based on the data structure for the operational status of the direction indicator;
detecting the incident upon determining that the data structure for the operational status of the direction indicator is not indicating the direction of the turn to be made by the vehicle, and
upon detecting the incident while the vehicle is engaged in automated driving, transmitting a signal to a driver of the vehicle to switch from automated driving to manual driving.

* * * * *